June 13, 1939.  R. T. HEDFIELD  2,162,306
GAUGE ADJUSTING MEANS
Filed Feb. 5, 1938   2 Sheets-Sheet 1
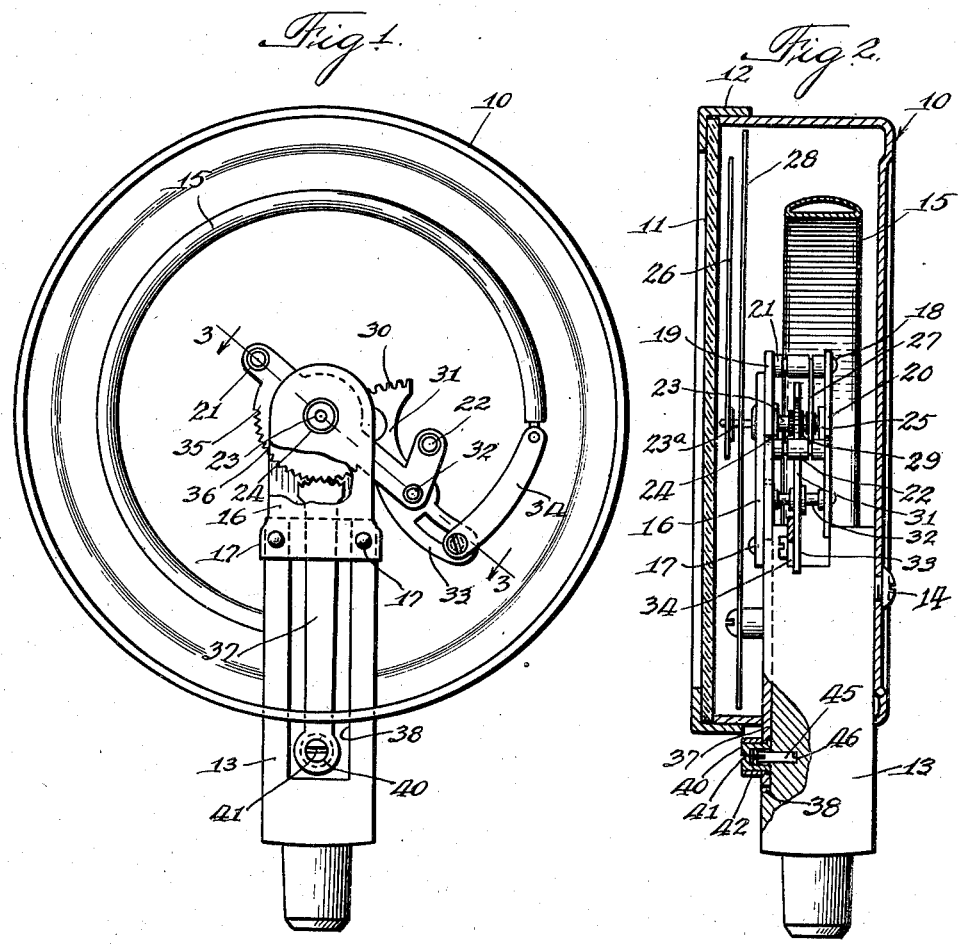
Inventor
Reynold T. Hedfield.

June 13, 1939.  R. T. HEDFIELD  2,162,306
GAUGE ADJUSTING MEANS
Filed Feb. 5, 1938  2 Sheets—Sheet 2

Inventor
Reynold T. Hedfield.
By Ames, Thiess, Olson & Mickelsahugen
Attys.

Patented June 13, 1939

2,162,306

UNITED STATES PATENT OFFICE 2,162,306

GAUGE ADJUSTING MEANS

Reynold T. Hedfield, Chicago, Ill., assignor to Jas. P. Marsh Corporation, Chicago, Ill., a corporation of Illinois Application February 5, 1938, Serial No. 188,856

12 Claims. (Cl. 73—109)

This invention relates to gauges and has special reference to so-called "zero adjustment gauges" in which the hand or other indicator actuated by a pressure responsive element or other suitable mechanism may be easily and conveniently adjusted to "zero" position upon the graduated dial of the gauge.

More particularly, this invention relates to a gauge comprising an element responsive to variations in a physical condition and a graduated dial having a pointer arranged to move thereover in response to variations of the element together with a support and a transmission mechanism between the element and the pointer, a frame being pivotally mounted on the support at the axis of the pointer for carrying the transmission mechanism and means movably mounted on the support for cooperatively engaging an arcuate portion of the frame to move the frame and thereby adjust the pointer by a movement of the engaging means.

This invention is particularly adapted for use in connection with substantially all types of pressure gauges such as thermometer gauges, hydraulic gauges, high pressure gauges and gauges such as are employed in connection with household and commercial compressors such as are used in the refrigeration art.

One of the objects of this invention is to provide a gauge of the character indicated above which may be used particularly for testing in field service work and which will not easily get out of order, may be easily adjusted to zero position and is provided with a relatively wide range of adjustment.

A further object of this invention is to provide a gauge of the character above referred to having a zero adjustment accessible from outside the casing, or at least accessible without disassembling the gauge mechanism.

It is also an object of this invention to provide a gauge of the above characteristics having a zero adjustment in which it is substantially impossible to injure the device by any operation of the adjusting means.

Also, it is an object of this invention to provide a gauge of the hereinabove referred to type having a zero adjustment with a wide range therefrom, and which is of comparatively few parts, inexpensive to manufacture, easy to assemble and which will not readily get out of order.

It is a still further object of this invention to provide a gauge of the above indicated character, whether adapted for measuring pressures or otherwise, which incorporates the adjusting feature herein described and which may be assembled as a unit and mounted as a unit within the gauge casing or housing.

Other objects and advantages of this invention will hereinafter be more particularly pointed out and for a more complete understanding of the characteristic features of this invention, reference may now be had to the following description when taken together with the accompanying drawings, in which latter:

Figure 1 is a front elevational view of a gauge embodying the features of this invention, the cover, dial and pointer being removed from the face thereof;

Fig. 2 is a side elevational view of Fig. 1 showing the casing and cover in section;

Figure 3:
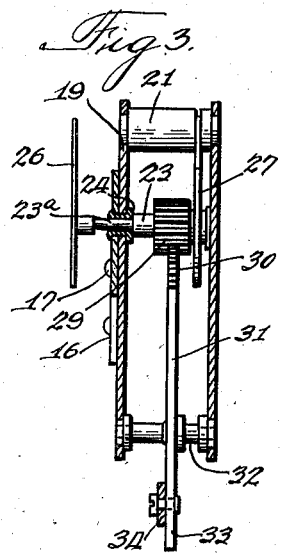
Fig. 3 is an enlarged sectional view of the transmission mechanism taken on the line 3—3 of Fig. 1.

Referring now to the drawings and more articularly to Figs. 1 to 4 inclusive thereof, the gauge comprises a casing 10 having a transparent cover 11 which is held in position by means of a retaining ring 12. This ring is arranged to telescope the casing 10 and is retained in position by any suitable means such as, for example, a bayonet slot and pin connection.

A vertical post or tubular fitting 13 extends through an opening in the bottom of the casing 10 and is secured therein by means of a screw 14. The fitting 13 has the usual passage therein communicating with a Bourdon expansible and contractible tube 15 such as is commonly used in pressure gauges and which is secured in any suitable manner to the fitting whereby the tube is in communication with the passage through the fitting in the usual manner.

An indicator operating mechanism, to be hereinafter described, is connected to the free end of the Bourdon tube 15 and is mounted on a support 16 which is, in turn, rigidly secured to the fitting 13 by any suitable means such as pins 17. The indicator operating mechanism comprises a shiftable frame 18 which, in the embodiment illustrated, comprises two spaced parallel side plates 19 and 20 of L-shaped configuration that are permanently secured together by suitable spacing posts 21 and 22 disposed adjacent the ends of the legs of the L-shaped plates.

An indicator shaft 23 is rotatably mounted in the frame 18 by being journaled in bearings 24 and 25 which latter are in turn secured in apertures of the plates 19 and 20. A reduced extension 23a of the shaft 23 extends outwardly of the plate 19 to support an indicating hand 26. The shaft 23 is provided with the usual hair spring 27 secured thereto and to the frame 18, all in the well known manner as shown in Fig. 2. The indicator 26 plays over a graduated dial 28 in the usual manner.

The shaft 23 is also provided with a pinion 29 fixed thereon for cooperation with a gear segment 30 integrally formed on a lever 31, which latter is pivotally mounted on the shaft 32 of the frame 18. The lever 31 is provided with an integrally formed slotted extension 33 that is flexibly connected to the Bourdon tube 15 by means of a link 34 as shown more particularly in Fig. 1.

The frame 18, comprising the front plate 19 and the rear plate 20 and the associated indicator operating mechanism, is so mounted upon the support 16 as to be rotatably adjusted about the fixed axis of the indicator shaft 23. Thus the position of the indicator 26 may be adjusted in any position, within limits, relative to the graduations formed upon the dial face 28. In other words, when the frame 18 is rotated with respect to the fixed support 16 about an axis coincident with the fixed axis of rotation of the shaft 23, and since the shaft 23 and indicator 26 are mounted on the frame 18, the indicator 26 is thus capable of being adjusted with respect to the fixed dial face 28 whereby "zero adjustment" of the gauge may be effected.

Rotation of the frame 18 as aforesaid is effected in the following manner: As shown more particularly in Fig. 3, the bearing 24 extends through an aperture in the plate 19 and through an aperture in the support 16. A flange of the bearing 24 engages the rear face of the plate 19 and the extending material of a counterbore portion of the bearing 24 is beaded over the front face of the support 16 to form an eyelet. It will, therefore, be seen that when the frame 18 and its associated mechanism including the shaft 23 and the indicator 26 are rotated upon the bearing 24, the indicator 26 will be moved relative to the Bourdon tube 15.

As shown in Fig. 1, the indicator 26 is operatively connected to the Bourdon tube 15 through the link 34, the lever 31, the gear segment 30, the pinion 29 and the shaft 23, all of which elements, excepting the link 34, being mounted upon the frame 18. When the frame 18 is rotated about the bearing 24, the compensating action of the aforesaid assembly of elements will cause the indicator 26 to be rotated in the opposite direction as the frame 18 without disturbing the normal functioning of the Bourdon tube 15. As a result, the indicator 26 is therefore capable of being adjusted over a wide range by imparting a small rotatable movement to the frame 18.

The plate 19 is provided with an enlargement 35 having an arcuate periphery preferably described by a radius about the axis of the shaft 23. The arcuate periphery is preferably provided with a gear segment 36 for engaging a gear segment on the free end of an arm 37, the arm 37 being pivotally mounted on the fitting 13. The fitting 13 has a recessed face 38 of sufficient width to permit a desired pivotal movement of the arm 37 which is disposed therein. As shown in Figs. 1 and 2 of the drawings, a portion of the fitting 13 extends beyond the confines of the casing 10, and the arm 37 likewise has a portion extending beyond the confines of the casing for direct access thereto for operating the arm into its various positions of adjustment.

Figure 4:
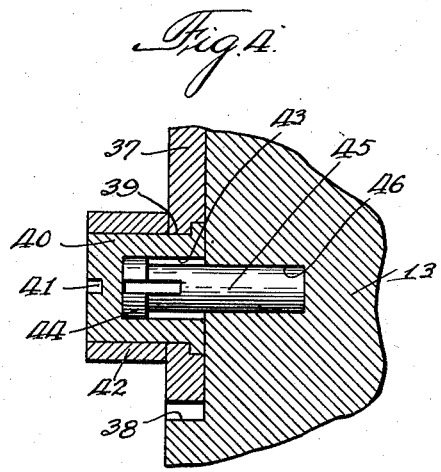
Fig. 4 is an enlarged fragmentary detailed sectional view of the pivot for the arm of the actuating mechanism.

Referring now more particularly to Fig. 4 of the drawings, the arm 37 is provided with a counterbore aperture 39 for receiving a flanged shell 40 having a tool engaging formation 41 on the ouer end thereof. A sleeve 42 is disposed on the outer periphery of the shell 40 and has a force fit therewith so that the arm 37 and shell 40 have, in effect, a fixed relation therebetween. The bore 43 of the shell 40 is of a diameter to receive in frictional engagement therewith a bifurcated head portion 44 extending from a shank portion 45 of a pin, the shank having a force fit engagement with an aperture 46 in the fitting 13.

In assembling the arm 37 on the fitting for the operation of the frame 18, it is only necessary to force the bifurcated head of the pin into the aperture 43 and the frictional engagement therebetween is sufficient to prevent displacement of the arm from the pin yet permit relative rotation therebetween when a tool engages the tool engaging formation 41 to pivot the arm 37. Prior to disposing the arm 37 on the pivot pin, the frame 18 is disposed in a normal position of adjustment with respect to the Bourdon tube 15 and the arm 37 is thereafter frictionally engaged on the pin with the segmental end thereof engaging the gear segment 36 at an intermediate position for successful operation. The range of adjustment is only limited by the width of the recess 38 of the fitting which, of course, may be of any desired size.

Figure 5:
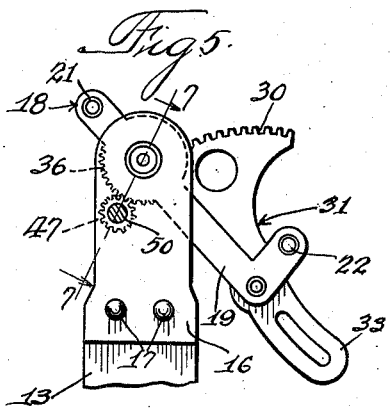
Fig. 5 is a fragmentary front elevational view of a modified form of transmission mechanism embodying the features of this invention.
Figure 6:
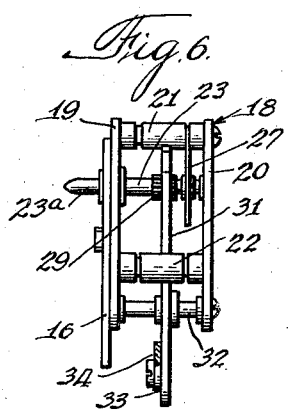
Fig. 6 is a side elevational view of Fig. 5.
Figure 7:
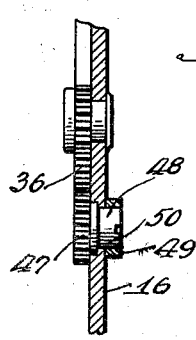
Fig. 7 is an enlarged detailed sectional view taken on the line 7—7 of Fig. 5.

Referring now more particularly to the embodiment shown in Figs. 5 to 7 inclusive of the drawings, it will be noted that the elements in general are similar to those just described and the same reference characters are applied thereto except that the arm 37 is supplanted in this embodiment by a pinion 47 which engages the gear segment 36. The frame 18 may, however, be mounted in a reverse order so that access to the pinion 47 may be had through an aperture in the casing 10. However, the same parts may be employed in the same relative relations with the exception that the support 16 may be mounted on the rear side of the fitting 13 instead of on the front side as is illustrated in the drawnigs. When the support is mounted on the front side of the fitting 13, access is had to the pinion by removal of the transparent cover 2.

As shown more particularly in Fig. 7, the pinion 47 has a reduced extension 48 which passes through an aperture in the fixed support 16, a collar 49 having a force fit on the reduced extension 48 and abutting the side of the fixed support 16 opposite to that on which the pinion 47 is mounted. A tool engaging formation 50 is provided in the reduced extension 48 for the rotatable operation of the pinion 47 to move the frame 18 into its positions of adjustment.

While but two embodiments of this invention are herein shown and described, it is to be understood that various modifications thereof may be apparent to those skilled in the art without departing from the spirit and scope of this invention and, therefore, the same is only to be limited by the scope of the prior art and the appended claims.

I claim:

1. A gauge of the character described, comprising an element responsive to variations in a physical condition, a graduated dial, a pointer arranged to move over said dial in response to variations of said element, a support, a transmission mechanism between said element and said pointer, a frame pivotally mounted on said support at the axis of said pointer and carrying said transmission mechanism, and an arm pivotally mounted on said support and having a free end cooperatively engaging said frame to move said frame and thereby adjust said pointer by a pivotal movement of said arm.

2. A gauge of the character described, comprising an element responsive to variations in a physical condition, a graduated dial, a pointer arranged to move over said dial in response to variations of said element, a support, a transmission mechanism between said element and said pointer, a frame pivotally mounted on said support at the axis of said pointer and carrying said transmission mechanism, a gear segment fixed to said frame, and an arm pivotally mounted on said support and having a gear segment on its free end cooperatively engaging the gear segment of said frame to move said frame and thereby adjust said pointer by a pivotal movement of said arm.

3. A gauge assembled as a unit for insertion in a casing, which gauge comprises an element responsive to variations in a physical condition, a graduated dial, a pointer arranged to move over said dial in response to variations of said element, a support, on which said casing is mounted, a transmission mechanism between said element and said pointer, a frame pivotally mounted on said support at the axis of said pointer and carrying said transmission mechanism, and an arm pivotally mounted on said support outside of the confines of said casing and having a free end extending into said casing for cooperatively engaging said frame to move said frame and thereby adjust said pointer by a pivotal movement of said arm.

4. A gauge of the character described, comprising an element responsive to variations in a physical condition, a graduated dial, a pointer arranged to move over said dial in response to variations of said element, a recessed support, a transmission mechanism between said element and said pointer, a frame pivotally mounted on said support at the axis of said pointer and carrying said transmission mechanism, and an arm pivotally mounted within the recess of said support and having a free end cooperatively engaging said frame to move said frame and thereby adjust said pointer by a pivotal movement of said arm.

5. A gauge of the character described, comprising an element responsive to variations in a physical condition, a graduated dial, a pointer arranged to move over said dial in response to variations of said element, a support, a transmission mechanism between said element and said pointer, a frame pivotally mounted on said support at the axis of said pointer and carrying said transmission mechanism, said frame having an arcuate portion described by a radius about the pivotal point thereof, and means mounted on said support for cooperatively engaging the arcuate portion of said frame to move said frame and thereby adjust said pointer by movement of said engaging means.

6. A gauge of the character described, comprising an element responsive to variations in a physical condition, a graduated dial, a pointer arranged to move over said dial in response to variations of said element, a support, a transmission mechanism between said element and said pointer, a frame provided with an arcuate enlargement and pivotally mounted on said support at the axis of said pointer, said frame carrying said transmission mechanism, and means movably mounted on said support for cooperatively engaging the arcuate enlargement of said frame to move said frame and thereby adjust said pointer by a pivotal movement of said movable means.

7. A gauge of the character described, comprising an element responsive to variations in a physical condition, a graduated dial, a pointer arranged to move over said dial in response to variations of said element, a support, a transmission mechanism between said element and said pointer, a frame pivotally mounted on said support at the axis of said pointer and carrying said transmission mechanism, a gear segment on said frame, and a pinion rotatably mounted on said support cooperatively engaging the gear segment of said frame to move said frame and thereby adjust said pointer by a pivotal movement of said pinion.

8. A gauge of the character described, comprising an element responsive to variations in a physical condition, a graduated dial, a pointer arranged to move over said dial in response to variations of said element, a support, a transmission mechanism between said element and said pointer, a frame pivotally mounted on said support at the axis of said pointer and carrying said transmission mechanism, said frame having an arcuate portion described by a radius about the pivotal point thereof, and a rotatable adjusting member mounted on said support cooperatively engaging the arcuate portion of said frame to move said frame and thereby adjust said pointer by a rotative movement of said adjusting member.

9. A gauge of the character described, comprising an element responsive to variations in a physical condition, a graduated dial, a pointer arranged to move over said dial in response to variations of said element, a support, a transmission mechanism between said element and said pointer, a frame pivotally mounted on said support at the axis of said pointer and carrying said transmission mechanism, a pin having a shank portion fixed to said support and a head portion extending therefrom, and an arm pivotally mounted on said pin and having a free end cooperatively engaging said frame to move said frame and thereby adjust said pointer by a pivotal movement of said arm.

10. A gauge comprising a support, a frame pivotally mounted on said support, an indicator pivotally mounted on the axis of said frame, a transmission operatively associated with said indicator and arranged for operative connection with an indicator controlling means, an arm for moving said frame, and a pin having a shank portion fixed to said support and a head portion extending therefrom for engagement with an aperture of said arm to frictionally hold said arm against displacement therefrom and to permit relative rotation therewith.

11. A gauge comprising a support, a frame pivotally mounted on said support, an indicator pivotally mounted on the axis of said frame, a transmission operatively associated with said indicator and arranged for operative connection with an indicator controlling means, an arm for moving said frame, and a pin having a shank portion fixed to said support and a bifurcated head portion extending therefrom for engagement with an aperture of said arm to frictionally hold said arm against displacement therefrom and to permit relative rotation therewith.

12. A gauge comprising a support, a frame pivotally mounted on said support, an indicator pivotally mounted on the axis of said frame, a transmission operatively associated with said indicator and arranged for operative connection with an indicator controlling means, an arm for moving said frame, a pin including a shank portion having a force fit in an aperture of said support and a bifurcated enlarged head portion extending therefrom, a shell extending through an aperture of said arm with a flange thereof abutting against one side of said arm and a sleeve having a force fit over the shell and abutting against the other side of said arm, said bifurcated head portion engaging the bore of said shell to frictionally hold said arm against displacement therefrom and to permit relative rotation therewith.

REYNOLD T. HEDFIELD.